US012589302B2

(12) United States Patent
Yang et al.

(10) Patent No.: US 12,589,302 B2
(45) Date of Patent: Mar. 31, 2026

(54) METHOD AND APPARATUS FOR CONTROLLING VIRTUAL CHARACTER, TERMINAL, STORAGE MEDIUM, AND PROGRAM PRODUCT

(71) Applicant: Tencent Technology (Shenzhen) Company Limited, Shenzhen (CN)

(72) Inventors: Wei Yang, Shenzhen (CN); Jian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 555 days.

(21) Appl. No.: 17/985,109

(22) Filed: Nov. 10, 2022

(65) Prior Publication Data

US 2023/0075245 A1 Mar. 9, 2023

Related U.S. Application Data

(63) Continuation of application No. PCT/CN2022/072249, filed on Jan. 17, 2022.

(30) Foreign Application Priority Data

Jan. 21, 2021 (CN) .......................... 202110084115.3

(51) Int. Cl.
A63F 13/537 (2014.01)
A63F 13/55 (2014.01)
(52) U.S. Cl.
CPC ............ A63F 13/537 (2014.09); A63F 13/55 (2014.09)
(58) Field of Classification Search
CPC ............................... A63F 13/55; A63F 13/537
See application file for complete search history.

(56) References Cited

U.S. PATENT DOCUMENTS

2013/0190094 A1* 7/2013 Ronen ..................... A63F 13/79
463/42
2013/0260898 A1 10/2013 Pepe et al.
(Continued)

FOREIGN PATENT DOCUMENTS

CN 1936909 A 3/2007
CN 107596691 A 1/2018
(Continued)

OTHER PUBLICATIONS

Tencent Technology, Korean Office Action, KR Patent Application No. 10-2023-7016917, Dec. 16, 2024, 12 pgs.
(Continued)

*Primary Examiner* — David L Lewis
*Assistant Examiner* — Shauna-Kay Hall
(74) *Attorney, Agent, or Firm* — Morgan, Lewis & Bockius LLP

(57) ABSTRACT

This application discloses a method for controlling a virtual character performed by a terminal. The method includes: displaying an activity main interface of a guild battle activity; displaying, in response to a battle operation for a first position of the guild battle activity, a branch selection interface of the first position; determining, in response to a selection operation for a target branch of the first position, an attack branch of a virtual character as a target branch; displaying an offensive and defensive battle interface of the target branch when a current team completes battle preparation, the offensive and defensive battle interface being used for displaying a battle scene between the current team and an enemy team; and controlling, in response to a control operation for the virtual character, the virtual character to perform a corresponding operation in the battle scene. This application may effectively reduce the requirements for server resources.

20 Claims, 11 Drawing Sheets

(56)          References Cited

U.S. PATENT DOCUMENTS

| | | |
|---|---|---|
| 2014/0121025 A1 | 5/2014 | Liu |
| 2015/0231499 A1* | 8/2015 | Mizukami ............... A63F 13/35 |
| | | 463/31 |
| 2016/0236087 A1* | 8/2016 | McNeil ................. A63F 13/847 |
| 2020/0139247 A1 | 5/2020 | Shigeta et al. |
| 2022/0184504 A1* | 6/2022 | Hasegawa ............. A63F 13/795 |

FOREIGN PATENT DOCUMENTS

| | | |
|---|---|---|
| CN | 112717401 A | 4/2021 |
| JP | 2018122021 A | 8/2018 |
| JP | 6458094 B1 | 1/2019 |

OTHER PUBLICATIONS

Grace Scavenger Games, "Legend of the Galactic Heroes 4 EX" Aug. 2014, Retrieved from the Internet: https://m.blog.naver.com/iyouhe/220106935016.

Tencent Technology, WO, PCT/CN2022/072249, Apr. 13, 2022, 5 pgs.

Tencent Technology, IPRP, PCT/CN2022/072249, Jul. 20, 2023, 6 pgs.

Tencent Technology, ISR, PCT/CN2022/072249, Apr. 13, 2022, 3 pgs.

* cited by examiner

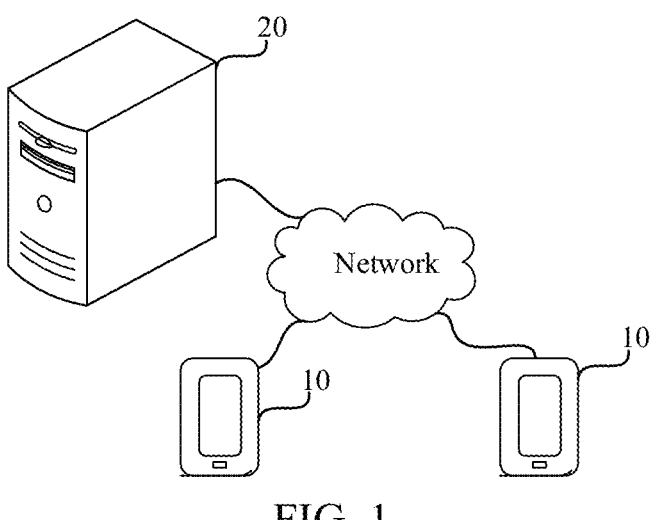

FIG. 1

Display an activity main interface of a guild battle activity, the guild battle activity including team offensive and defensive activities asynchronously performed between different guilds
210

Display, in response to a battle operation for a first position of the guild battle activity, a branch selection interface of the first position
220

Determine, in response to a selection operation for a target branch of the first position, an attack branch of a virtual character as a target branch
230

Display an offensive and defensive battle interface of the target branch when a current team completes battle preparation, the offensive and defensive battle interface being used for displaying a battle scene between the current team and an enemy team
240

Control, in response to a control operation for the virtual character, the virtual character to perform a corresponding operation in the battle scene
250

FIG. 2

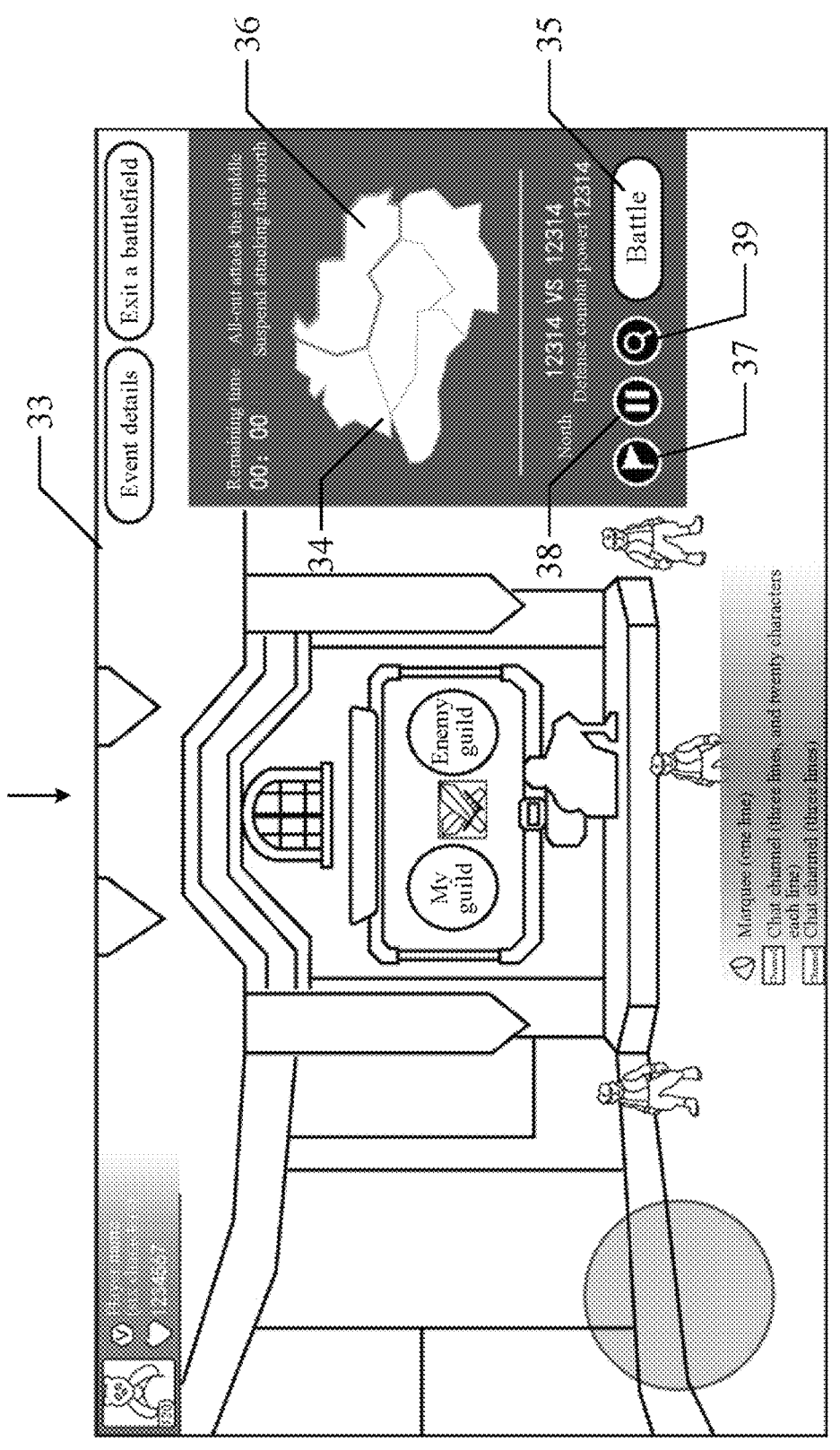
FIG. 3, continued

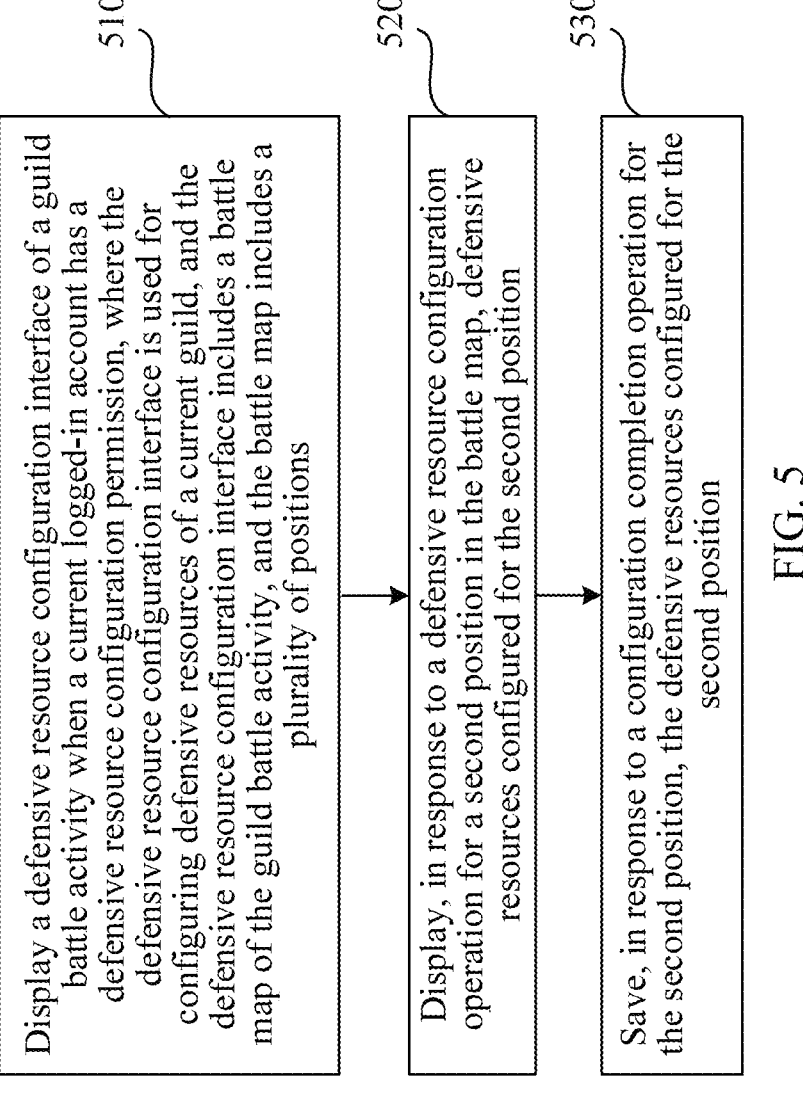

Display a defensive resource configuration interface of a guild battle activity when a current logged-in account has a defensive resource configuration permission, where the defensive resource configuration interface is used for configuring defensive resources of a current guild, and the defensive resource configuration interface includes a battle map of the guild battle activity, and the battle map includes a plurality of positions

510

Display, in response to a defensive resource configuration operation for a second position in the battle map, defensive resources configured for the second position

520

Save, in response to a configuration completion operation for the second position, the defensive resources configured for the second position

METHOD AND APPARATUS FOR CONTROLLING VIRTUAL CHARACTER, TERMINAL, STORAGE MEDIUM, AND PROGRAM PRODUCT

CROSS-REFERENCE TO RELATED APPLICATIONS

This application is a continuation application of PCT Patent Application No. PCT/CN2022/072249, entitled "VIRTUAL CHARACTER CONTROL METHOD AND APPARATUS, TERMINAL, STORAGE MEDIUM AND PROGRAM PRODUCT" filed on Jan. 17, 2022, which claims priority to Chinese Patent Application No. 202110084115.3, filed with the State Intellectual Property Office of the People's Republic of China on Jan. 21, 2021, and entitled "METHOD AND APPARATUS FOR CONTROLLING VIRTUAL CHARACTER, TERMINAL, STORAGE MEDIUM, AND PROGRAM PRODUCT", all of which are incorporated herein by reference in their entirety.

FIELD OF THE TECHNOLOGY

Embodiments of this application relate to the field of computer and internet technologies, and in particular, to a method and apparatus for controlling a virtual character, a terminal, a storage medium, and a program product.

BACKGROUND OF THE DISCLOSURE

A side-scrolling game is a common type of game.

In a current side-scrolling game, a user is usually provided with a plurality of different levels, and the user controls a virtual character to kill an enemy character in the level to achieve the objective of passing the level.

However, product functions of the current side-scrolling game are relatively simple.

SUMMARY

Embodiments of this application provide a method and apparatus for controlling a virtual character, a terminal, a storage medium, and a program product. The technical solutions are as follows:

According to an aspect of this embodiment of this application, a method for controlling a virtual character is performed by a terminal, and the method including:

displaying an activity main interface of a guild battle activity, the guild battle activity including team offensive and defensive activities asynchronously performed between different guilds;

in response to a battle operation for a first position of the guild battle activity, displaying a branch selection interface of the first position, the branch selection interface being used for displaying a plurality of branches included in the first position;

in response to a selection operation for a target branch of the first position, displaying an attack branch of a virtual character as a target branch;

displaying an offensive and defensive battle interface of the target branch when a current team completes battle preparation, the offensive and defensive battle interface being used for displaying a battle scene between the current team and an enemy team; and in response to a control operation for the virtual character, controlling the virtual character to perform a corresponding operation in the battle scene.

According to an aspect of this embodiment of this application, an apparatus for controlling a virtual character is provided, the apparatus including:

an activity main interface display module, configured to display an activity main interface of a guild battle activity, the guild battle activity including team offensive and defensive activities asynchronously performed between different guilds;

a branch selection interface display module, configured to display, in response to a battle operation for a first position of the guild battle activity, a branch selection interface of the first position, the branch selection interface being used for displaying a plurality of branches included in the first position;

a target branch determining module, configured to determine, in response to a selection operation for a target branch of the first position, an attack branch of a virtual character as a target branch;

an offensive and defensive battle interface display module, configured to display, an offensive and defensive battle interface of the target branch when a current team completes battle preparation, the offensive and defensive battle interface being used for displaying a battle scene between the current team and an enemy team; and a virtual character control module, configured to control, in response to a control operation for the virtual character, the virtual character to perform a corresponding operation in the battle scene.

According to an aspect of this embodiment of this application, a terminal is provided, including a processor and a memory, the memory storing at least one instruction, the at least one instruction being loaded and executed by the processor and causing the terminal to implement the method for controlling a virtual character.

According to an aspect of this embodiment of this application, a non-transitory computer-readable storage medium is provided, the storage medium storing at least one instruction, the at least one instruction being loaded and executed by a processor of a terminal and causing the terminal to implement the method for controlling a virtual character.

According to an aspect of this embodiment of this application, a computer program product or a computer program is provided, the computer program product or the computer program including computer instructions, the computer instructions being stored in a non-transitory computer-readable storage medium. A processor of a terminal reads the computer instructions from the computer-readable storage medium, and executes the computer instructions, to cause the terminal to perform the method for controlling a virtual character.

This application provides a product function for a guild battle activity, which causes team offensive and defensive activities asynchronously performed between different guilds to be implemented. The so-called asynchronously performed team offensive and defensive activities refer to that a defending side has asynchronous data and defensive resources of the defending side are pre-configured. In a process of attacking the defensive resources configured by the defending side, the defending side does not need to perform synchronous operations, and the defensive resources deployed by the defending side automatically (such as through artificial intelligence (AI) control policies) launch a counterattack to an attacking side. For the type of asynchronously performed team offensive and defensive activities, the defending side and the attacking side do not have to be simultaneously online, but also may implement the product function, and avoid a large quantity of clients to be simultaneously online, resulting in performance bottlenecks such as lag and delay on a server, which may effectively reduce requirements for processing resources of the server.

BRIEF DESCRIPTION OF THE DRAWINGS

FIG. 1 is a schematic diagram of an implementation environment of a solution according to an embodiment of this application.

FIG. 2 is a flowchart of a method for controlling a virtual character according to an embodiment of this application.

FIG. 5 is a schematic diagram of a configuration process of defensive resources according to an embodiment of this application.

DESCRIPTION OF EMBODIMENTS

Figure 3:
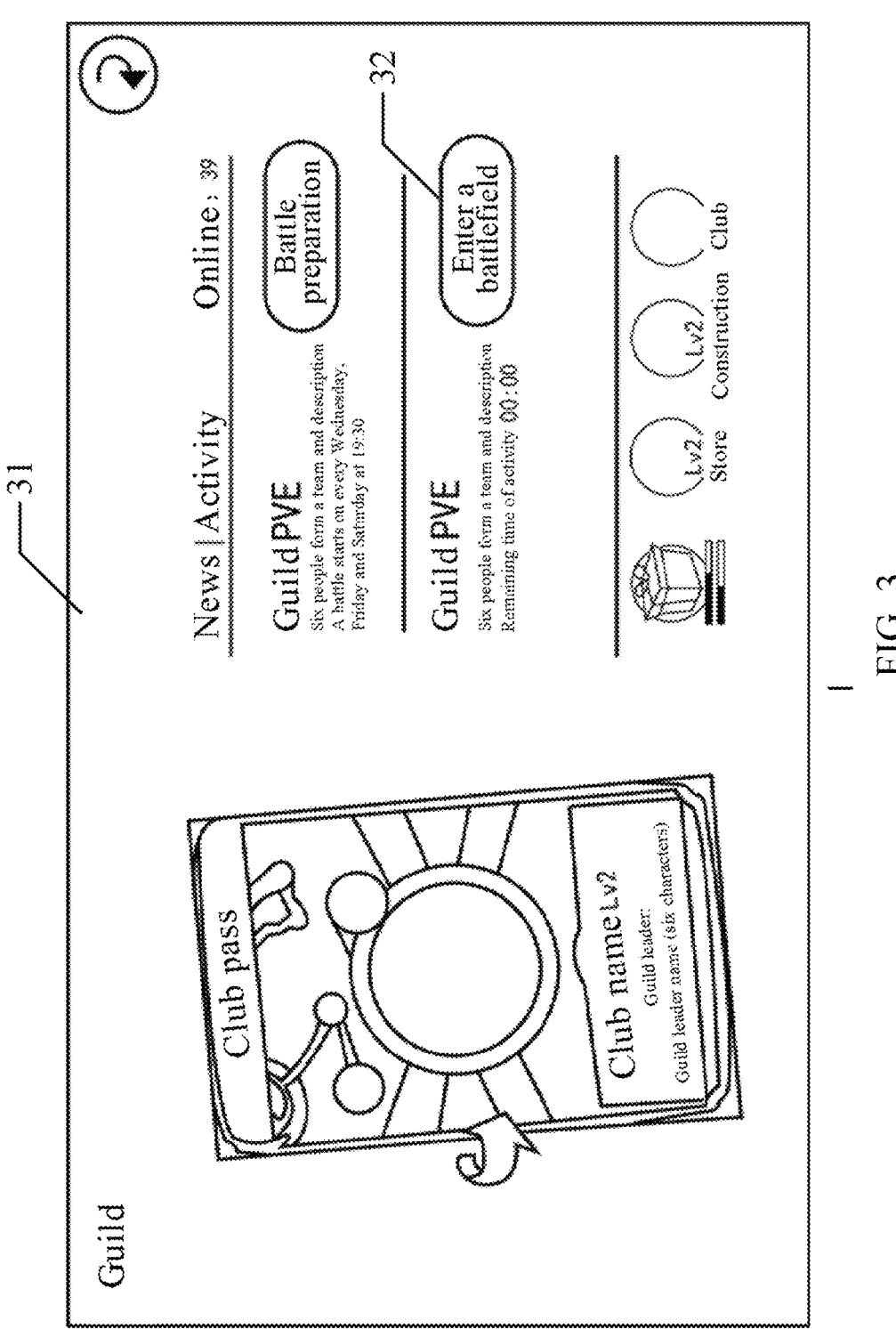
FIG. 3 is a schematic diagram of a guild system interface and an activity main interface according to an embodiment of this application.

FIG. 1 is a schematic diagram of an implementation environment of a solution according to an embodiment of this application. The implementation environment of the solution may be implemented as a game system. The implementation environment of the solution may include: a terminal 10 and a server 20.

The quantity of the terminal 10 may be more than one. The terminal 10 may be an electronic device such as a mobile phone, a tablet computer, a personal computer (PC), a game console, or the like. A client for running a game application may be installed in the terminal 10, and the game application may provide functions introduced in the technical solution of this application, such as a guild battle activity. In some embodiments, the game application may be a side-scrolling game.

The side-scrolling game may be any application that may provide a virtual environment for the user to control a virtual character to perform two-dimensional activities in the virtual environment, such as a side-scrolling level passing game, a side-scrolling fighting game, a side-scrolling parkour game, or the like. In some embodiments, at least one motion path for the virtual character to walk is included in the side-scrolling game. The motion path is a two-dimensional motion path. When the user controls the virtual character to walk, the user may control the virtual character to move up, down, left, and right in a two-dimensional plane, but the user may fail to control the virtual character to move forward and backward in the three-dimensional space.

The server 20 may be one server, a server cluster including a plurality of servers, or a cloud computing service center. The server 20 may be a backend server of the game application, and is configured to provide backend services for a client.

The terminal 10 and the server 20 may communicate with each other through a network.

In the technical solution of this application, a game function of a guild battle activity is provided. The guild battle activities refer to asynchronously performed team offensive and defensive activities between different guilds.

A guild is a group created in a game application, and a guild may usually be joined by a plurality of different users (or user accounts) to form a group. The guild may also be referred to as other names such as a team, a group, or the like. In a guild, one or more guild leaders (usually one) may be included, one or more administrators, and one or more ordinary guild members may further be included. Certainly, the guild leaders and administrators are also members of the guild. The guild leader is the creator and owner of the guild. The administrator may be set by the guild leader to help the guild leader perform some daily management work on the guild. In addition, other characters may further be set in the guild in combination with actual product requirements, which is not limited in this embodiment of this application. For some game applications, some game features are only available to guild members. In other words, the user can use the game function only if the user joins a specific guild. If the user does not join any guild, the user cannot use the game function. A user (or user account) can usually only join one guild, and the user may change the guild the user joins as required. Certainly, a user is allowed to join a plurality of guilds, which is not limited in this application. In some possible designs, some game functions may be participated after a plurality of users who join the same guild form a team. For example, the guild battle activity proposed in this application may be participated after the user joins the guild, and the user and other members of the guild need to form a team to participate in a game.

The so-called team offensive and defensive activities refer to that there are at least two guilds, one guild is the defending side, and the other guild is the attacking side. A plurality of players on the attacking side form a team to attack the defending side by manipulating a virtual character in the game, and the defending side defends by using the configured defensive resources (such as a defensive character and/or a defensive facility). A team on the attacking side may include a plurality of players (such as six), and each player may control a virtual character to attack the defending side. In this way, the plurality of players synchronously control their respective virtual characters to attack the defending side together through teamwork. The so-called asynchronously performed team offensive and defensive activities refer to that a defending side has asynchronous data and defensive resources of the defending side are pre-configured. In a process of attacking the defensive resources configured by the defending side, the defending side does not need a player to perform synchronous operations, and the defensive resources deployed by the defending side automatically (such as through AI control strategies) launch a counterattack to the attacking side. In addition, when the defending side deploys defensive resources, a configuration policy for a user generated content (UGC) element is introduced. That is, players on the defending side may customize and configure information such as quantity, type, and location of defending characters and/or defending facilities.

In a possible embodiment, the attacking side enters the game in the form of a team of six to challenge a defensive line arranged by the defending side, and a goal is to break down key buildings (such as camps). In some embodiments, a maximum duration of a single game may be predefined, such as six minutes. If the attacking side successfully destroys the key buildings within the maximum duration of the single game, the game ends in advance and the settlement is performed; and if the attacking side does not destroy the key buildings when the maximum duration of a single game is reached, the game is ended and the settlement is performed when the maximum duration of a single game is reached.

In a possible embodiment, the guild battle activity is not open at any time, but is only open during specific time periods for players to participate in. For example, the guild battle activity is limited to a time period every week, and is open every Wednesday, Friday, and Sunday at 7:30 pm and lasts about 30 minutes. The current round starts when the activity starts every Wednesday, and the current round ends when the activity ends every Sunday. That is, an activity round may include one or more open activity periods.

In a possible embodiment, in each activity round, the system matches a plurality of guilds into a group, and a single-round competition is performed within the group. For example, each group includes four guilds, an activity round includes three activity periods, and in each activity period, there are two rounds of competition within the group. For example, each group includes four guilds A, B, C, and D. In the first event period, the guild A battles against the guild B, and the guild C battles against the guild D; in the second event period, the guild A battles against the guild C, and the guild B battles against the guild D; and in the third event period, the guild A battles against the guild D, and the guild B battles against the guild C. Using the guild A battling against the guild B as an example, the guild A organizes a team to attack the pre-configured defensive line of the guild B. In addition, the guild B also organizes a team to attack the pre-configured defensive line of the guild A. By calculating respective points of the guild A and the guild B, a win-draw-loss relationship between the two parties in the battle may be determined. The points of the guild may be calculated based on at least one of the following: the quantity/quantity of times of enemy defensive resources that are destroyed, whether to destroy key enemy buildings, the time consumed to destroy the key enemy buildings, or the like. A win-draw-loss relationship of each battle determines round points and season points obtained by each guild. The round points are used for sorting guilds in a current round of the group. After the current round ends, the round points are recalculated in a next round. The season points are used for sorting all guilds in the current season. After the current season ends, the season points are recalculated in a next season. In addition, a season may include a plurality of activity rounds, such as five or ten activity rounds.

In some embodiments, the plurality of guilds participating in a same round of guild battle activity are determined by grouping based on a guild combat power value. For example, all guilds are sorted in descending order of guild combat power values, and every four guilds are selected as a group to participate in the same round of guild battle activity. In some embodiments, the guild combat power value is an average combat power value or a maximum combat power value within a set historical period. The set historical period may be the last half month or the last week. Compared with directly using a combat power value at a current moment, by using the average combat power value or the maximum combat power value within the set historical period, players may be prevented to a certain extent from deliberately reducing the combat power value to match a guild with low combat power.

Next, the technical solution of this application is described in detail by using several embodiments.

FIG. 2 is a flowchart of a method for controlling a virtual character according to an embodiment of this application. An execution entity of each step of the method may be a terminal 10 in the implementation environment shown in FIG. 1, such as a client of a game application installed and running in a terminal 10. The method may include the following steps (210 to 250):

Step 210. Display an activity main interface of a guild battle activity, the guild battle activity including team offensive and defensive activities asynchronously performed between different guilds.

During opening hours of the guild battle activity, if the user wants to participate in the guild battle activity or view related information of the guild battle activity, the user may click on a related interface control to trigger an activity main interface that displays the guild battle activity. The activity main interface is used for displaying the related information of the guild battle activity, such as guild names and/or icons of both parties in the battle, a battle map, remaining time, a battle button, or the like.

In an example, as shown in FIG. 3, after the user clicks the "Guild" button in the main interface of the game, a guild system interface 31 is triggered to be displayed. During opening hours of the guild battle activity, an "Enter a battlefield" button 32 in the guild system interface 31 may be triggered. The user clicks the "Enter a battlefield" button 32 to switch an activity main interface 33 that displays the guild battle activity. In the activity main interface 33, information such as guild names and/or icons of both parties in a current round of battle, a battle map 34, remaining time, and a "Battle" button 35 is displayed.

In some embodiments, the battle map includes a plurality of positions. A position refers to a battle region in the battle map. A global battle map may be divided into a plurality of positions, such as five positions a central position, an eastern position, a southern position, a western position, and a northern position. The user may directly click on a specific position to trigger a selection operation for the position.

In an example, in response to a battle selection operation for the first position in the battle map, it is determined that the battle operation for the first position of the guild battle activity is received. For example, as shown in FIG. 3, after the user clicks on a northern position 36, the user clicks the "Battle" button 35 to perform a battle operation on the northern position 36.

In an example, in response to an attack mark operation for the first position in the battle map, attack prompt information for the first position is displayed. For example, as shown in FIG. 3, the activity main interface 33 further includes an attack mark button 37. After the user clicks on the northern position 36, and then clicks the attack mark button 37 to perform an attack mark operation on the northern position 36, the activity main interface 33 may display attack prompt information for the northern position 36, such as "Attack the northern position with full strength". In some embodiments, the attack mark button 37 may only be visible to a guild leader, but not visible to other members of the guild.

In an example, in response to an attack suspending mark operation for the first position in the battle map, attack suspending prompt information for the first position is displayed. For example, as shown in FIG. 3, the activity main interface 33 further includes an attack suspending mark button 38. After the user clicks on the northern position 36, and then clicks the attack suspending mark button 38 to perform the attack suspending mark operation on the northern position 36, the activity main interface 33 may display attack suspending prompt information for the northern position 36, such as "Suspend attacking the northern position". In some embodiments, the attack suspending mark button 38 may only be visible to a guild leader, but not visible to other members of the guild.

In an example, in response to a position viewing operation for the first position in the battle map, a terrain of the first position and defensive resources arranged by the enemy team in the first position are displayed. For example, as shown in FIG. 3, the activity main interface 33 further includes a position viewing button 39. After the user clicks on the northern position 36, and then clicks the position viewing button 39 to perform a position viewing operation on the northern position 36, the terrain of the northern position and the defensive resources arranged by the enemy team in the northern position are displayed. In some embodiments, the position viewing button 39 may be visible to all members.

In some embodiments, owner information corresponding to each position may further be displayed in the battle map, where the owner information is used for indicating an owner of the position. For example, the owner information may simply indicate whether the position belongs to the current guild. For example, a position that belongs to the current guild is displayed in a first color (such as blue), and a position that does not belong to the current guild is displayed in a second color (such as red). In another example, the owner information may further clearly indicate a name of an owner of each position. In the battle map, the corresponding owner information of each position is displayed, which may implement the visual and intuitive distinction of the owner of each position in the interface, thereby helping to locate a position that needs to be attacked more efficiently and quickly, and improving the efficiency of selecting a position.

In this embodiment of this application, in the battle map, the user may perform a plurality of different operations such as a battle selection operation, an attack mark operation, an attack suspending mark operation, and a position viewing operation for a specific position, to cause the product function to be more diverse and rich. For example, through the attack mark operation and attack suspending mark operation, actions of each user of the attacking side may be kept as consistent as possible, so that the defending side may be defeated more efficiently, thereby shortening the time consumed in the game and saving server resources.

Step 220. Display, in response to a battle operation for a first position of the guild battle activity, a branch selection interface of the first position.

The branch selection interface is used for displaying a plurality of branches included in the first position. In some embodiments, the branch selection interface is further used for displaying an attack branch selected by each virtual character in the current team that attacks the first position.

The first position may be any position among the plurality of positions included in the battle map. If the user performs the battle operation for the first position in the manner described above, the branch selection interface of the first position is displayed. The branch selection interface is used for displaying a plurality of branches included in the first position, and attacking an attack branch selected by each virtual character of the current team that attacks the first position. In this embodiment of this application, a position may include a plurality of branches, for example, a position includes three branches, and each branch may be independent of each other, that is, the player may fail to control the virtual character to move from one branch to another branch; or in some designs, the player may also be allowed to control the virtual character to move from one branch to another branch. Players on the attacking side may select an appropriate branch as an attack branch according to the defensive resources deployed by the defending side in each branch of the first position and the branch selected by other players in the team. For example, the attacking side includes six players, two players select an upper branch, the other two players select a middle branch, and the remaining two players select a lower branch; or three players select the upper branch, the other one player selects the middle branch, and the remaining two players select the lower branch. A maximum quantity of players allowed to be accommodated may be set in each branch, or may not be set.

Step 230. Determine, in response to a selection operation for a target branch of the first position, an attack branch of a virtual character as a target branch.

Figure 4:
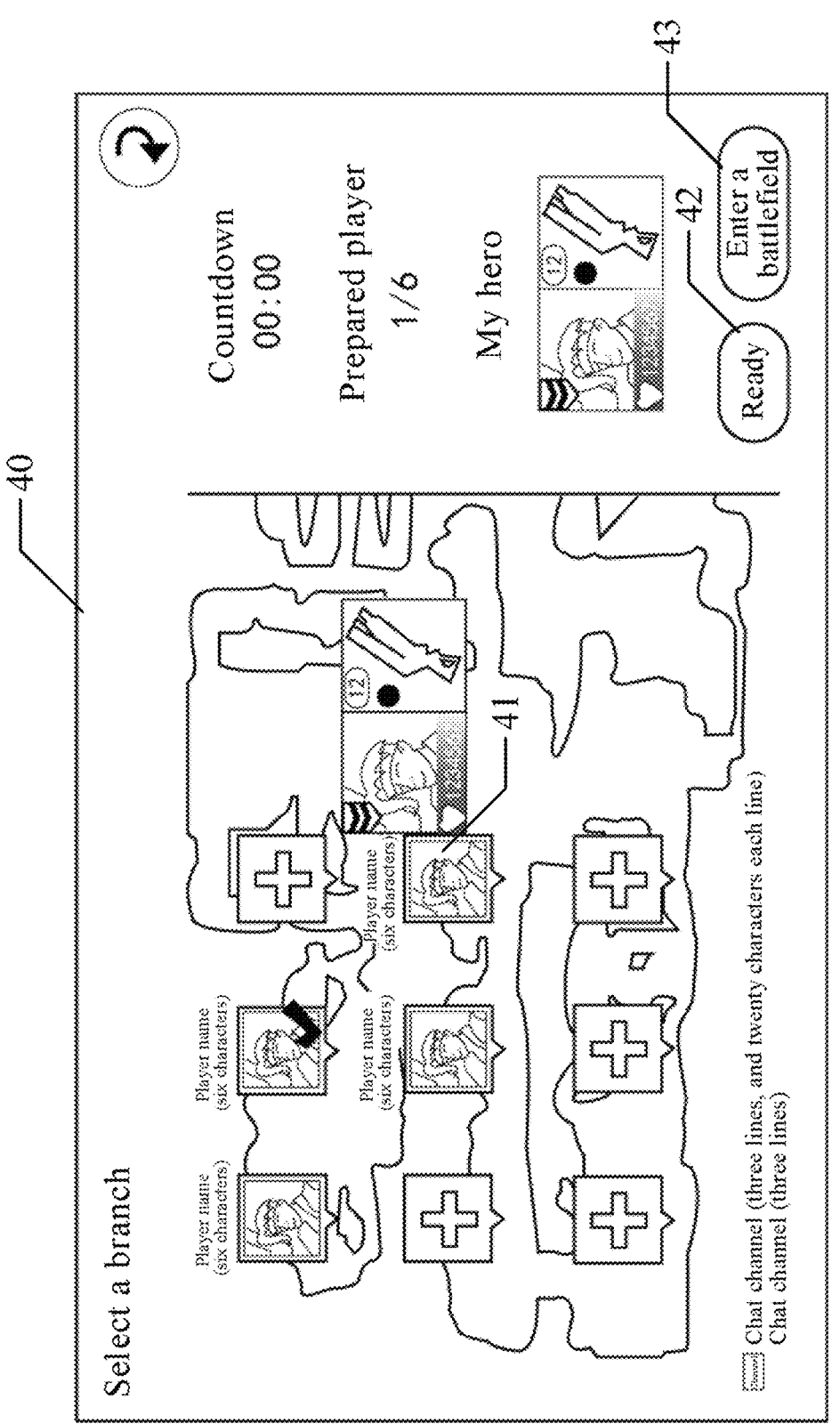
FIG. 4 is a schematic diagram of a branch selection interface according to an embodiment of this application.

For example, FIG. 4 is a schematic diagram of a branch selection interface 40. In the branch selection interface 40, an upper sky route, a middle regular route, and a lower pit route are included, and different branches may have different terrains and attributes. For example, the sky route has a high-altitude jump platform, with a large space and few footholds, which tests the operation and the defensive force is relatively weak; the regular route has a regular battlefield and medium space, which is easy to operate, and the defensive force is dense; and the pit route has a low pit path, a small space, a small operating space, and a medium defensive force. Each branch includes three selection controls (as shown in a + sign in the figure). If the user wants to select the middle branch as the attack branch, then the user may click on a selection control on the middle branch. Correspondingly, in the middle branch of the branch selection interface 40, an account avatar 41 of the user is displayed.

In addition, as shown in FIG. 4, the branch selection interface 40 may further include a preparation button 42 and a position entry button 43. The preparation button 42 is visible to all members, and the user clicks the preparation button 42 to indicate that the user has selected to complete the attack branch and is prepared to enter the position. The position entry button 43 is only visible to a team leader. After all members of the team are prepared, the position entry button 43 may be clicked, and the team leader clicks the position entry button 43 to trigger the position entry to start a current round of offensive and defensive battle. In some embodiments, after the user clicks the preparation button 42 to enter a preparation state, a preparation prompt icon corresponding to the user may be displayed in the branch selection interface 40.

Step 240. Display an offensive and defensive battle interface of the target branch when a current team completes battle preparation, the offensive and defensive battle interface being used for displaying a battle scene between the current team and an enemy team.

The attacking side attacks an instance dungeon, and in a single round, except for teammates, other guild members do not affect each other; and when entering the single game again, it is equivalent to refreshing the instance dungeon and returning to an initial state, and a progress is not stored. The objective of the attacking side is to destroy the defensive resources arranged by the defending side, for example, it is best to destroy base defensive resources of the defending side; and the defending side does not need to perform operations, and automatically defends through the defensive resources arranged in an early stage.

During the game, if the player on the attacking side is disconnected or has a weak network, the virtual character controlled by the player does not leave the team or disconnect, but is temporarily taken over by AI to perform some simple movement and attacking operations, and a related prompt such as being taken over by AI may be added.

In some embodiments, the target branch may be divided into a plurality of sections, which are sequentially displayed in the order of each section in the offensive and defensive battle interface. For example, defensive resources arranged by the enemy team in a first section of the target branch are displayed in the offensive and defensive battle interface; in response to the defensive resources arranged in the first section being destroyed, defensive resources arranged by the enemy team are displayed in a next section of the first section in the offensive and defensive battle interface; and in response to defensive resources arranged in a last section of the target branch being destroyed, base defensive resources of the first position are displayed in the offensive and defensive battle interface.

That is, only when the defensive resources arranged in the current section are destroyed, the next section is displayed, otherwise the next section is not displayed; and final base defensive resources are displayed only if the defensive resources arranged in the last section are destroyed, otherwise the base defensive resources are not displayed. In this manner, each section is rendered and displayed, which may save the resources of the terminal on rendering and displaying, prevent the terminal from performing unnecessary rendering and displaying operations, and implement on-demand rendering and displaying. In addition, in this manner, the player may be effectively controlled to advance the game progress only after destroying the corresponding defensive resources, to prevent the player from advancing the game progress by controlling the virtual character to run quickly, and to enhance the intensity and integrity of the offensive and defensive battle.

Step 250. Control, in response to a control operation for the virtual character, the virtual character to perform a corresponding operation in the battle scene.

The user may control the virtual character to move in the battle scene (such as walking, sprinting, jumping, squatting, or the like), or may also control the virtual character to use a virtual weapon (such as a virtual firearm) to attack the enemy defensive resources in the battle scene to destroy the enemy defensive resources.

During the game, the attacking side may obtain in-game points by destroying the defensive resources arranged by the defending side. In a possible embodiment, in-game points may only be obtained by destroying some key defensive resources. The key defensive resources may be some specific defensive characters and/or defensive facilities, and the key defensive resources may be displayed differently in the interface to help the attacking side to distinguish the key defensive resources. Different positions correspond to different games, and consequently, the in-game points of the games of different positions are calculated independently and do not interfere with each other.

When the battle map includes a plurality of positions, an owner of each position is determined according to an order of values of the in-game points of the guilds of both parties in the battle in each position. Assuming that the guilds of both parties in the battle are a guild A and a guild B. The guild A attacks a defensive line deployed by the guild B in each position, and the guild B attacks a defensive line deployed by the guild A in each position. The guild A and the guild B share the same battle map, but the form of the defensive line deployed in each position of the battle map may vary. Assuming that the guild A attacks the defensive line deployed by the guild B in a central position, and obtains in-game points S1, and the guild B attacks the defensive line deployed by the guild A in a central position, and obtains in-game points S2, if S1>S2, it indicates that an owner of the central position is the guild A (that is, the guild A occupies the central position). Otherwise, if S1<S2, it indicates that an owner of the central position is the guild B (that is, the guild B occupies the central position). Corresponding occupation points may be set for each position, and the occupation points corresponding to different positions may be the same or different. For example, occupation points of the central position are 5, occupation points of an eastern position are 4, occupation points of a southern position are 3, the occupation points of a western position are 2, and an occupation point of a northern position is 1. After an activity period ends, according to the occupation of each position, occupation points of the guilds of both parties in the battle are calculated. According to a value of the occupation points, a win-draw-loss relationship between the two parties is determined, and further rewards are issued according to the win-draw-loss relationship, and the guild is given corresponding round points and season points.

In some embodiments, the terminal may further display the first ranking data and/or the second ranking data of the current guild in the related user interface. The first ranking data refers to a ranking of the current guild in a current round of guild battle activity, and the current round of guild battle activity includes participation of a plurality of guilds, and the ranking is determined according to in-game points of each of the plurality of guilds. The second ranking data refers to a ranking of the current guild in a guild battle activity of a current season, and the guild battle activity of the current season includes participation of the plurality of guilds, and the ranking is determined according to round points of each of the plurality of guilds.

In summary, the technical solution provided in this embodiment of this application provides a product function for guild battle activities, which causes team offensive and defensive activities asynchronously performed between different guilds. The so-called asynchronously performed team offensive and defensive activities refer to that a defending side has asynchronous data and defensive resources of the defending side are pre-configured. In a process of attacking the defensive resources configured by the defending side, the defending side does not need to perform synchronous operations, and the defensive resources deployed by the defending side automatically (such as through AI control strategies) launch a counterattack to the attacking side. For the type of asynchronously performed team offensive and defensive activities, the defending side and the attacking side do not have to be simultaneously online, but also may implement the product function, and avoid a large quantity of clients to be simultaneously online, resulting in performance bottlenecks such as lag and delay on a server, which may effectively reduce requirements for processing resources of the server.

In addition, through the guild battle activity, habits of cooperation and communication among players may be cultivated, and a habit of going online regularly is cultivated among the players, thereby providing more user stickiness and online volume for game products, and avoiding waste of server resources.

In addition, during an opening period of the guild battle activity, different players/teams in the guild are allowed to simultaneously participate in the in-game offensive and defensive competition in the same position, implementing a repeatable and playable game experience.

A configuration process of defensive resources is described in detail below with reference to FIG. 5. The process may include the following steps (510 to 530):

Step 510. Display a defensive resource configuration interface of the guild battle activity when a current logged-in account has a defensive resource configuration permission, where the defensive resource configuration interface is used for configuring the defensive resources of a current guild, and the defensive resource configuration interface includes a battle map of the guild battle activity, and the battle map includes a plurality of positions.

The defensive resource configuration permission refers to the permission to configure defensive resources. In some embodiments, a guild leader and/or administrator of a guild has the defensive resource configuration permission for the guild.

Figure 6:
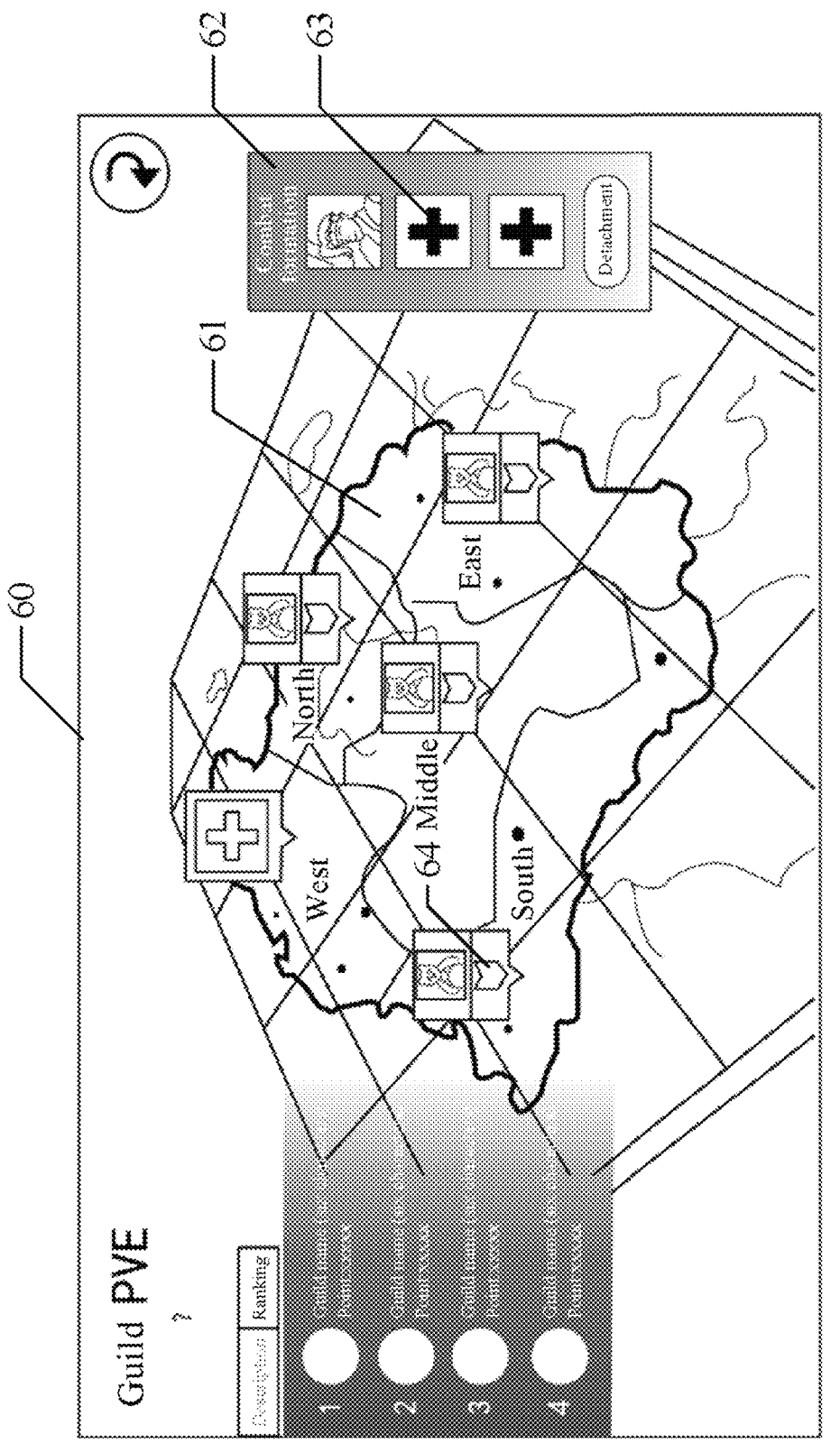
FIG. 6 is a schematic diagram of a defensive resource configuration interface according to an embodiment of this application.

In an example, FIG. 6 is a schematic diagram of a defensive resource configuration interface 60. With reference to FIG. 3, during non-opening hours of the guild battle activity, the user is allowed to configure the defensive resources of the current guild. The user clicks a "Battle preparation" button in the guild system interface 31 to switch to display the defensive resource configuration interface 60 shown in FIG. 6. The user may see the battle map 61 of the guild battle activity in the defensive resource configuration interface 60. As shown in FIG. 6, the battle map 61 includes five positions such as a central position, an eastern position, a southern position, a western position, and a northern position.

In addition, a defensive character providing interface of the guild battle activity is displayed when a current logged-in account has a defensive character providing permission, where the defensive character providing interface is used for providing a defensive character to a current guild. In response to a trigger operation for a defensive character adding control in the defensive character providing interface, the defensive character provided to the current guild is added and displayed. The defensive character providing permission refers to the permission to provide a defensive character for the current guild. The defensive character may be one or more virtual characters owned by a current logged-in account. In some embodiments, the defensive character providing permission is open to all members of the guild, and may also be open to some members of the guild by the guild leader or administrator, such as only members whose combat power value is higher than a threshold. There may be a threshold for the quantity of defensive characters that each user account may provide to the current guild. For example, the threshold is three, which indicates that a user account may only provide three defensive characters at most. These defensive characters that are provided may be used by the guild leader or administrator when deploying defensive resources.

In an example, as shown in FIG. 6, the defensive character providing interface 62 includes an adding control 63. The user may click on the adding control 63 to add a defensive character provided to the current guild as defensive resource deployment, and each defensive character may be configured with a corresponding virtual weapon.

Step 520. Display, in response to a defensive resource configuration operation for a second position in the battle map, defensive resources configured for the second position.

The second position may be any position among the plurality of positions included in the battle map. For example, the user may click on the battle map to select the second position. A defensive resource configuration operation is used for configuring defensive resources to the selected position (such as the second position).

Figure 7:
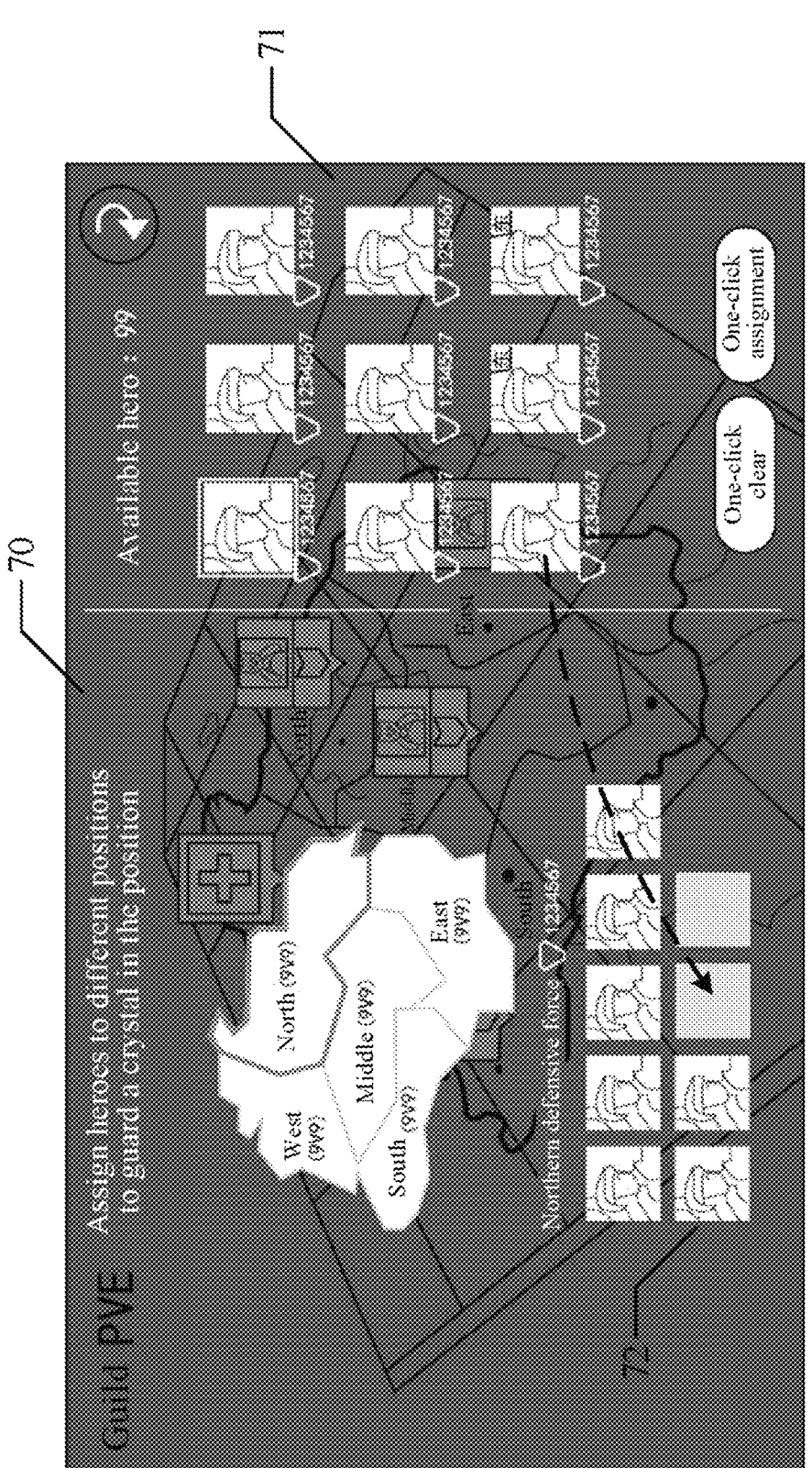
FIG. 7 is a schematic diagram of a defensive character configuration interface according to an embodiment of this application.
Figure 8:
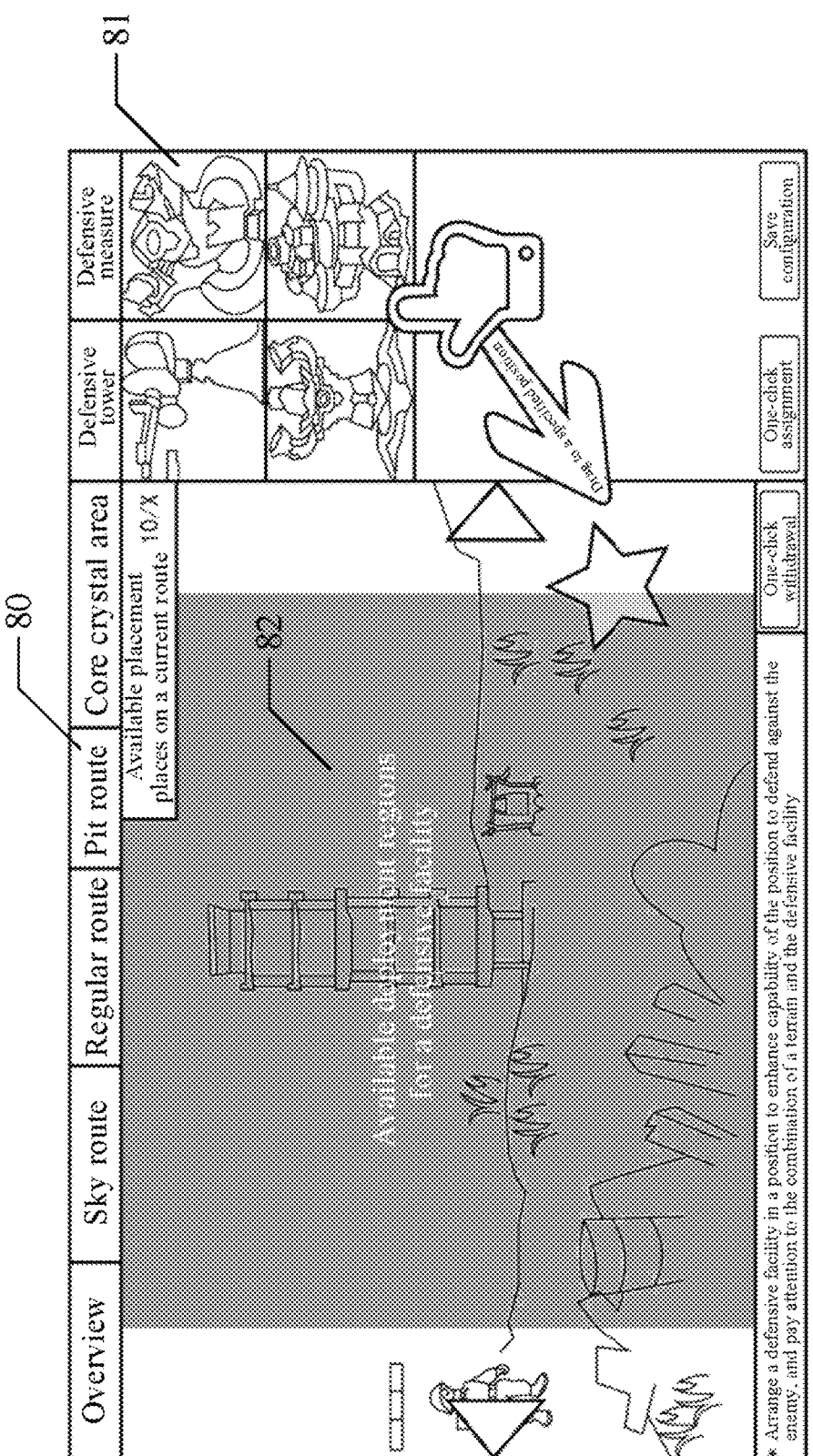
FIG. 8 is a schematic diagram of a defensive facility configuration interface according to an embodiment of this application.

In an example, as shown in FIG. 6, if the user wants to configure the defensive resources of the central position, after the user clicks on an icon 64 corresponding to the central position, a defensive character configuration option and a defensive facility configuration option are displayed. The defensive character configuration option is used for triggering the display of a defensive character configuration interface, and the defensive facility configuration option is used for triggering the display of a defensive facility configuration interface. The defensive character configuration interface is used for configuring defensive characters, and FIG. 7 shows a schematic diagram of a defensive character configuration interface 70. The defensive facility configuration interface is used for configuring defensive facilities, and FIG. 8 shows a schematic diagram of a defensive facility configuration interface 80.

In some embodiments, when the defensive resource configuration interface (or defensive character configuration interface) includes a defensive character configuration region and a defensive character selection region, in response to an operation instruction for adding a target defensive character in the defensive character selection region to the defensive character configuration region, the target defensive character configured for the second position is displayed in the defensive character configuration region. As shown in FIG. 7, the defensive character configuration interface 70 includes a defensive character configuration region 71 and a defensive character selection region 72. The defensive character configuration region 71 is used for displaying defensive characters that have been configured for each position, and the defensive character selection region 72 is used for displaying defensive characters that may be selected. The user may select and configure the defensive character by dragging an icon of a target defensive character from the defensive character selection region 72 to the defensive character configuration region 71.

In some embodiments, when the defensive resource configuration interface (or defensive facility configuration interface) includes a defensive facility configuration region and a defensive facility selection region, in response to an operation instruction for adding a target defensive facility in the defensive facility selection region to the defensive facility configuration region, the target defensive facility configured for the second position is displayed in the defensive facility configuration region. As shown in FIG. 8, the defensive facility configuration interface 80 includes a defensive facility configuration region 81 and a defensive facility selection region 82. The defensive facility configuration region 81 is used for displaying defensive facilities that have been configured for each position, and the defensive facility selection region 82 is used for displaying defensive facilities that may be selected. The user may select and configure the defensive facility by dragging an icon of a target defensive facility from the defensive facility selection region 82 to the defensive facility configuration region

81. The defensive arrangement includes but is not limited to a turret, a soldier generator, a character enhancer, an elite monster, a roadblock, or the like, which is not limited in this embodiment of this application.

In this embodiment of this application, the defensive resource configuration region and defensive resource selection region are displayed in the defensive resource configuration interface, and the defensive resource selection region and defensive resource configuration region are displayed in the same user interface, so that the user may more intuitively see the defensive resources and the defensive resources that have been configured, which helps to improve the efficiency and accuracy of the user configuration defensive resources.

In some embodiments, the defensive resource configuration interface further includes a shortcut configuration control, and the shortcut configuration control is used for quickly configuring defensive resources, such as including defensive characters and/or defensive facilities. For example, both the defensive character configuration interface 70 shown in FIG. 7 and the defensive facility configuration interface 80 described in FIG. 8 include a "One-click assignment" button. The "One-click assignment" button is the shortcut configuration control, which is used for triggering the automatic configuration of defensive characters and/or defensive facilities through a one-step operation.

In some embodiments, there is an upper limit of the defensive characters or defensive facilities that may be assigned on each position. When the upper limit is reached, an interface prompt may be provided.

The method provided in this embodiment of this application may further include the following steps: displaying, in response to a trigger operation for the shortcut configuration control, all position options and a current position option; automatically configuring, in response to a selection operation for all the position options, defensive resources for all positions in the battle map; and automatically configuring, in response to a selection operation for the current position option, defensive resources for a position currently in a selected state in the battle map.

When defensive characters and/or defensive facilities are automatically configured, automatic configuration may be performed according to preset configuration rules. Using the defensive characters of all positions that are automatically configured in the battle map as an example, candidate defensive characters may be sorted in descending order of combat power, and then based on the sorting result, one defensive character is selected each time. In the order of middle, east, west, south, north, north, south, west, east, and middle, a selected defensive character is assigned to a position each time until the candidate defensive character assignment is completed, or the defensive character settings for all positions are completed.

In this embodiment of this application, the defensive resources of all positions or the positions currently in the selected state are automatically configured, so that the automatic configuration of the defensive resources is implemented, the configuration operation of the user is reduced, and the configuration efficiency is further improved.

Step 530. Save, in response to a configuration completion operation for the second position, the defensive resources configured for the second position.

After the configuration is completed, the user may click on a configuration complete control in the defensive resource configuration interface, and the client saves the defensive resource information configured by the user accordingly.

Figure 9:
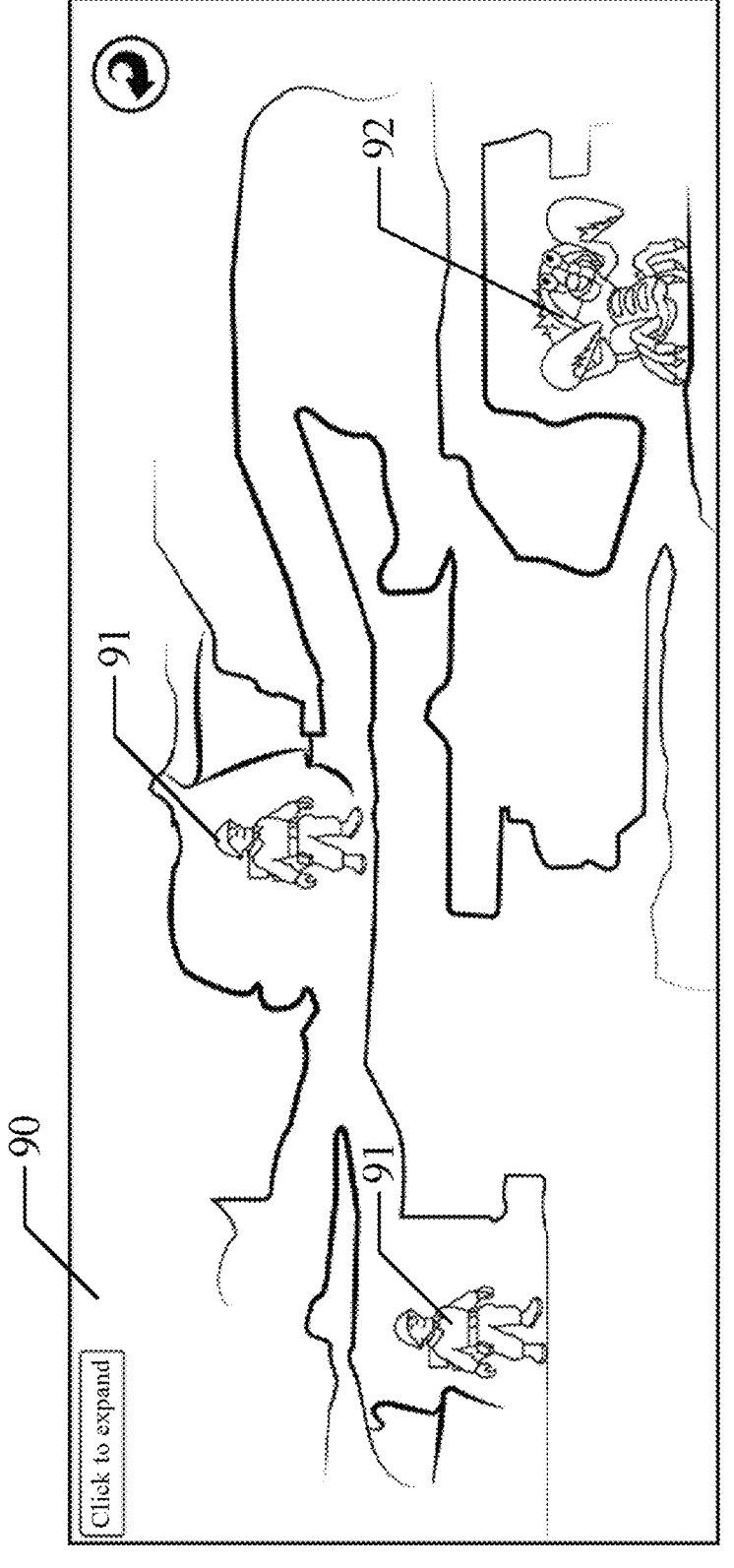
FIG. 9 is a schematic diagram of a defensive resource preview interface according to an embodiment of this application.

In some embodiments, after the step 530, the method may further include: displaying, in response to a preview operation for the second position, a terrain of the second position and defensive resources arranged by the current guild in the second position. For example, the defensive resource configuration interface may further include a preview control, the user clicks on the preview control to trigger the preview operation, and the client displays the configured terrain of the second position and the defensive resources arranged by the current guild in the second position, so that the user can intuitively know the configuration of the defensive line. In an example, the defensive resource preview interface may be as shown in FIG. 9. The defensive resource preview interface 90 includes the terrain of the position and the defensive resources arranged in the position, such as a defensive character 91 and a defensive facility 92.

In some embodiments, after the step 530, the method may further include: enabling, in response to a simulated battle permission enabling operation for the second position, a simulated battle permission of the second position, where members of the current guild are allowed to form a team to enter the second position to conduct an offensive and defensive battle when the simulated battle permission of the second position is enabled. After the defensive line is assigned, the guild leader or administrator may open the permission to members to conduct simulated battles to experience the strength of the defensive line of the position of the current party. There is no reward for the process. The gameplay in the simulated battle is exactly the same as the gameplay in the actual guild battle, and only the content of the points display is canceled. The simulated battle is closed during opening hours of the activity to avoid misoperation of the player.

In this embodiment of this application, a preview function or simulated battle function for a specific position is provided, so that the user may preview and simulate the attack of the configured defensive resources after configuring the defensive resources for the position, so that the user may see the defensive effect of the configured defensive resources and the user is provided with more useful information. If the user feels that there is something inappropriate after the preview, the user may adjust and modify the configured defensive resources, which helps improve the rationality and accuracy of defensive resource configuration.

In summary, in the technical solution provided in this embodiment of this application, by introducing a configuration policy of a UGC element, players on the defending side may customize the configuration of information such as quantity, type, and location of defensive characters and/or defensive facilities, which causes the configuration of the defensive resources to be more flexible and diverse, and provides the players with more strategy and interest. In addition, the configuration of defensive resources requires permission verification of a logged-in account. Only a logged-in account with permission can configure defensive resources, which may effectively prevent the defensive resources from being repeatedly or randomly configured, thus wasting processing resources of the terminal and the server.

The following is an apparatus embodiment of this application, which can be used to perform the method embodiments of this application. For details not disclosed in the apparatus embodiments of this application, refer to the method embodiments of this application.

Figure 10:
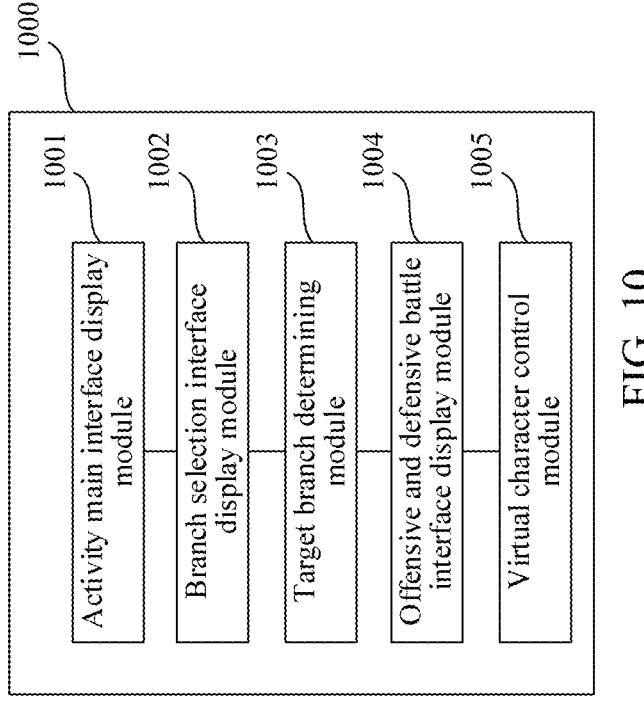
FIG. 10 is a block diagram of an apparatus for controlling a virtual character according to an embodiment of this application.

FIG. 10 is a block diagram of an apparatus for controlling a virtual character according to an embodiment of this application. The apparatus has functions of implementing the foregoing method for controlling a virtual character. The functions may be implemented by hardware, or may be implemented by hardware executing corresponding software. The apparatus may be a terminal or set in a terminal. The apparatus 1000 may include: an activity main interface display module 1001, a branch selection interface display module 1002, a target branch determining module 1003, an offensive and defensive battle interface display module 1004, and a virtual character controlling module 1005.

The activity main interface display module 1001 is configured to display an activity main interface of a guild battle activity, the guild battle activity including team offensive and defensive activities asynchronously performed between different guilds.

The branch selection interface display module 1002 is configured to display, in response to a battle operation for a first position of the guild battle activity, a branch selection interface of the first position, the branch selection interface being used for displaying a plurality of branches included in the first position.

The target branch determining module 1003 is configured to determine, in response to a selection operation for a target branch of the first position, an attack branch of a virtual character as a target branch.

The offensive and defensive battle interface display module 1004 is configured to display, an offensive and defensive battle interface of the target branch when a current team completes battle preparation, the offensive and defensive battle interface being used for displaying a battle scene between the current team and an enemy team.

The virtual character control module 1005 is configured to control, in response to a control operation for the virtual character, the virtual character to perform a corresponding operation in the battle scene.

In an exemplary embodiment, the activity main interface includes a battle map of the guild battle activity, and the battle map includes a plurality of positions; and the apparatus 1000 further includes an operation response module, configured to:

determine, in response to a battle selection operation for the first position in the battle map, that the battle operation for the first position of the guild battle activity is received;

display, in response to an attack mark operation for the first position in the battle map, attack prompt information for the first position;

display, in response to an attack suspending mark operation for the first position in the battle map, attack suspending prompt information for the first position; and display, in response to a position viewing operation for the first position in the battle map, a terrain of the first position and defensive resources arranged by the enemy team in the first position.

In an exemplary embodiment, the apparatus 1000 further includes an ownership information display module, configured to display owner information corresponding to each position in the battle map, where the owner information is used for indicating an owner of the position.

In an exemplary embodiment, the offensive and defensive battle interface display module 1004 is configured to:

display defensive resources arranged by the enemy team in a first section of the target branch in the offensive and defensive battle interface;

display, in response to the defensive resources arranged in the first section being destroyed, defensive resources arranged by the enemy team in a next section of the first section in the offensive and defensive battle interface; and display, in response to defensive resources arranged in a last section of the target branch being destroyed, base defensive resources of the first position in the offensive and defensive battle interface.

In an exemplary embodiment, the apparatus 1000 further includes a defensive resource configuration module, configured to:

display a defensive resource configuration interface of the guild battle activity when a current logged-in account has a defensive resource configuration permission, where the defensive resource configuration interface is used for configuring the defensive resources of a current guild, the defensive resource configuration interface includes a battle map of the guild battle activity, and the battle map includes a plurality of positions;

display, in response to a defensive resource configuration operation for a second position in the battle map, defensive resources configured for the second position; and save, in response to a configuration completion operation for the second position, the defensive resources configured for the second position.

In an exemplary embodiment, the defensive resource configuration module is configured to perform at least one of the following:

when the defensive resource configuration interface includes a defensive character configuration region and a defensive character selection region, displaying, in response to an operation instruction for adding a target defensive character in the defensive character selection region to the defensive character configuration region, the target defensive character configured for the second position in the defensive character configuration region; and when the defensive resource configuration interface includes a defensive facility configuration region and a defensive facility selection region, displaying, in response to an operation instruction for adding a target defensive facility in the defensive facility selection region to the defensive facility configuration region, the target defensive facility configured for the second position in the defensive facility configuration region.

In an exemplary embodiment, the defensive resource configuration interface further includes a shortcut configuration control, and the defensive resource configuration module is further configured to:

display, in response to a trigger operation for the shortcut configuration control, all position options and a current position option;

automatically configure, in response to a selection operation for all the position options, defensive resources for all positions in the battle map; and automatically configure, in response to a selection operation for the current position option, defensive resources for a position currently in a selected state in the battle map.

In an exemplary embodiment, the apparatus 1000 further includes a defensive resource preview module, configured to display, in response to a preview operation for the second position, a terrain of the second position and defensive resources arranged by the current guild in the second position.

In an exemplary embodiment, the apparatus 1000 further includes a simulated battle enabling module, configured to enable, in response to a simulated battle permission enabling operation for the second position, a simulated battle permission of the second position, where members of the current guild are allowed to form a team to enter the second position to conduct an offensive and defensive battle when the simulated battle permission of the second position is enabled.

In an exemplary embodiment, the apparatus 1000 further includes a defensive character adding module, configured to:

display a defensive character providing interface of the guild battle activity when a current logged-in account has a defensive character providing permission, where the defensive character providing interface is used for providing a defensive character to a current guild; and add and display, in response to a trigger operation for a defensive character adding control in the defensive character providing interface, the defensive character provided to the current guild.

In an exemplary embodiment, the apparatus 1000 further includes a ranking data display module, configured to perform at least one of the following:

displaying first ranking data of a current guild, where the first ranking data refers to a ranking of the current guild in a current round of guild battle activity, the current round of guild battle activity includes participation of a plurality of guilds, and the ranking is determined according to round points of each of the plurality of guilds.

displaying second ranking data of the current guild, where the second ranking data refers to a ranking of the current guild in a guild battle activity of a current season, the guild battle activity of the current season includes participation of the plurality of guilds, and the ranking is determined according to round points of each of the plurality of guilds.

In an exemplary embodiment, the plurality of guilds participating in a same round of guild battle activity are determined by grouping based on a guild combat power value, where the guild combat power value is an average combat power value or a maximum combat power value within a set historical period.

In an exemplary embodiment, the method is applied to a side-scrolling game.

In summary, the technical solution provided in this embodiment of this application provides a product function for guild battle activities, which causes team offensive and defensive activities asynchronously performed between different guilds. For the type of asynchronously performed team offensive and defensive activities, the defending side and the attacking side do not have to be simultaneously online, but also may implement the product function, and avoid a large quantity of clients to be simultaneously online, resulting in performance bottlenecks such as lag and delay on a server, which may effectively reduce requirements for processing resources of the server.

When the apparatus provided in the foregoing embodiments implements functions of the apparatus, it is illustrated with an example of division of each functional module. In the practical application, the function distribution may be finished by different functional modules according to the requirements, that is, the internal structure of the device is divided into different functional modules, to implement all or some of the functions described above. In addition, the apparatus and method embodiments provided in the foregoing embodiments belong to one conception. For the specific implementation process, refer to the method embodiments, and details are not described herein again.

Figure 11:
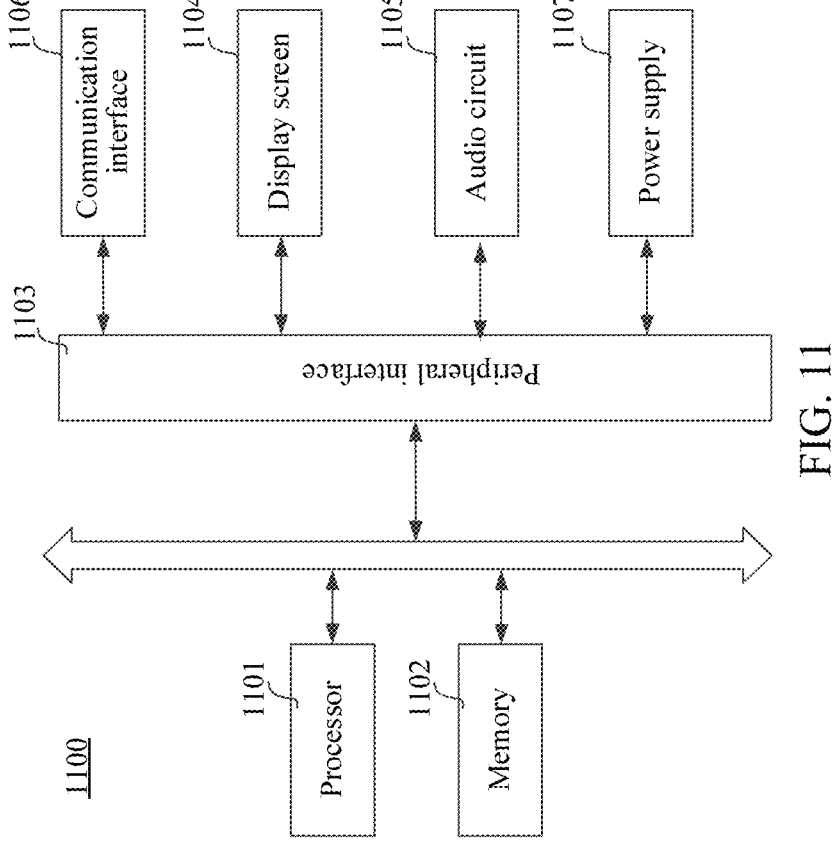
FIG. 11 is a schematic structural diagram of a terminal according to an according to an embodiment of this application.

FIG. 11 is a structural block diagram of a terminal 1100 according to an embodiment of this application. The terminal 1100 may be a mobile phone, a tablet computer, a smart television, a multimedia playback device, or a PC. The terminal 1100 may be the terminal described in the embodiment of FIG. 1.

Generally, the terminal 1100 includes a processor 1101 and a memory 1102.

The processor 1101 may include one or more processing cores, for example, a 4-core processor or an 8-core processor. The processor 1101 may be implemented by using at least one hardware form of a digital signal processor (DSP), a field programmable gate array (FPGA), and a programmable logic array (PLA). The processor 1101 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1101 may be integrated with a graphics processing unit (GPU). The GPU is configured to be responsible for rendering and drawing content that a display needs to display. In some embodiments, the processor 1101 may further include an artificial intelligence (AI) processor. The AI processor is configured to process computing operations related to machine learning.

The memory 1102 may include one or more computer-readable storage media that may be non-transitory. The memory 1102 may further include a high-speed random access memory and a non-volatile memory, such as one or more magnetic disk storage devices or flash storage devices.

In some embodiments, the terminal 1100 include: a peripheral interface 1103 and at least one peripheral. The processor 1101, the memory 1102, and the peripheral interface 1103 may be connected by using a bus or a signal cable. Each peripheral may be connected to the peripheral interface 1103 through a bus, a signal cable, or a circuit board. Specifically, the peripheral may include: at least one of a display screen 1104, an audio circuit 1105, a communication interface 1106, and a power supply 1107.

A person skilled in the art may understand that the structure shown in FIG. 11 does not constitute a limitation to the terminal 1100, and the terminal may include more or fewer components than those shown in the figure, or some components may be combined, or a different component deployment may be used.

The terminal 1100 may include a processor and a memory, the memory storing at least one instruction, at least one program, a code set or an instruction set. The at least one instruction, the at least one program, the code set, or the instruction set is configured to be executed by one or more processors to implement the method for controlling a virtual character.

In an exemplary embodiment, a computer-readable storage medium is further provided, the storage medium storing at least one instruction, at least one program, a code set, or an instruction set, and the at least one instruction, the at least one program, the code set, or the instruction set being executed by the processor of a terminal to implement the method for controlling a virtual character.

In some embodiments, the computer-readable storage medium may include: a read-only memory (ROM), a random-access memory (RAM), a solid state drive (SSD), an optical disc, or the like. The RAM may include a resistance random access memory (ReRAM) and a dynamic random access memory (DRAM).

In an exemplary embodiment, a computer program product or a computer program is further provided, the computer program product or the computer program including computer instructions, the computer instructions being stored in a computer-readable storage medium. A processor of a terminal reads the computer instructions from the computer-readable storage medium, and executes the computer instructions, to cause the terminal to perform the method for controlling a virtual character.

It is to be understood that "plurality of" mentioned in the specification means two or more. "And/or" describes an association relationship for describing associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for controlling a virtual character, performed by a terminal, the method comprising:

displaying an activity main interface of a guild battle activity, the guild battle activity including team offensive and defensive activities asynchronously performed between different guilds when the different guilds are not simultaneously online for performing the activities;

in response to a battle operation for a first position of the guild battle activity, displaying a branch selection interface of the first position, the branch selection interface being used for displaying a plurality of branches comprised in the first position;

in response to a selection operation for a target branch of the first position, determining an attack branch of a virtual character as a target branch;

displaying an offensive and defensive battle interface of the target branch when a current team completes battle preparation, the offensive and defensive battle interface being used for displaying a battle scene between the current team and an enemy team; and in response to a control operation for the virtual character, controlling the virtual character to perform a corresponding operation in the battle scene.

2. The method according to claim 1, wherein the activity main interface comprises a battle map of the guild battle activity, and the battle map comprises a plurality of positions; and the method further comprises:

determining, in response to a battle selection operation for the first position in the battle map, that the battle operation for the first position of the guild battle activity is received;

displaying, in response to an attack mark operation for the first position in the battle map, attack prompt information for the first position;

displaying, in response to an attack suspending mark operation for the first position in the battle map, attack suspending prompt information for the first position; and displaying, in response to a position viewing operation for the first position in the battle map, a terrain of the first position and defensive resources arranged by the enemy team in the first position.

3. The method according to claim 2, wherein the method further comprises:

displaying owner information corresponding to each position in the battle map, wherein the owner information is used for indicating an owner of the position.

4. The method according to claim 1, wherein the displaying an offensive and defensive battle interface of the target branch comprises:

displaying defensive resources arranged by the enemy team in a first section of the target branch in the offensive and defensive battle interface;

displaying, in response to the defensive resources arranged in the first section being destroyed, defensive resources arranged by the enemy team in a next section of the first section in the offensive and defensive battle interface; and displaying, in response to defensive resources arranged in a last section of the target branch being destroyed, base defensive resources of the first position in the offensive and defensive battle interface.

5. The method according to claim 1, wherein the method further comprises:

displaying a defensive resource configuration interface of the guild battle activity when a current logged-in account has a defensive resource configuration permission, wherein the defensive resource configuration interface is used for configuring the defensive resources of a current guild, the defensive resource configuration interface comprises a battle map of the guild battle activity, and the battle map comprises a plurality of positions;

displaying, in response to a defensive resource configuration operation for a second position in the battle map, defensive resources configured for the second position; and saving, in response to a configuration completion operation for the second position, the defensive resources configured for the second position.

6. The method according to claim 1, wherein the method further comprises:

displaying a defensive character providing interface of the guild battle activity when a current logged-in account has a defensive character providing permission, wherein the defensive character providing interface is used for providing a defensive character to a current guild; and adding and displaying, in response to a trigger operation for a defensive character adding control in the defensive character providing interface, the defensive character provided to the current guild.

7. The method according to claim 1, wherein the method further comprises at least one of the following:

displaying first ranking data of a current guild, wherein the first ranking data refers to a ranking of the current guild in a current round of guild battle activity, the current round of guild battle activity comprises participation of a plurality of guilds, and the ranking is determined according to round points of each of the plurality of guilds; and displaying second ranking data of the current guild, wherein the second ranking data refers to a ranking of the current guild in a guild battle activity of a current season, the guild battle activity of the current season comprises participation of the plurality of guilds, and the ranking is determined according to round points of each of the plurality of guilds.

8. A terminal, comprising a processor and a memory, the memory storing at least one instruction, the at least one instruction being loaded and executed by the processor and causing the terminal to perform a method for controlling a virtual character including:

displaying an activity main interface of a guild battle activity, the guild battle activity including team offensive and defensive activities asynchronously performed between different guilds when the different guilds are not simultaneously online for performing the activities;

in response to a battle operation for a first position of the guild battle activity, displaying a branch selection interface of the first position, the branch selection interface being used for displaying a plurality of branches comprised in the first position;

in response to a selection operation for a target branch of the first position, determining an attack branch of a virtual character as a target branch;

displaying an offensive and defensive battle interface of the target branch when a current team completes battle preparation, the offensive and defensive battle interface being used for displaying a battle scene between the current team and an enemy team; and in response to a control operation for the virtual character, controlling the virtual character to perform a corresponding operation in the battle scene.

9. The terminal according to claim 8, wherein the activity main interface comprises a battle map of the guild battle activity, and the battle map comprises a plurality of positions; and the method further comprises:

determining, in response to a battle selection operation for the first position in the battle map, that the battle operation for the first position of the guild battle activity is received;

displaying, in response to an attack mark operation for the first position in the battle map, attack prompt information for the first position;

displaying, in response to an attack suspending mark operation for the first position in the battle map, attack suspending prompt information for the first position; and displaying, in response to a position viewing operation for the first position in the battle map, a terrain of the first position and defensive resources arranged by the enemy team in the first position.

10. The terminal according to claim 9, wherein the method further comprises:

displaying owner information corresponding to each position in the battle map, wherein the owner information is used for indicating an owner of the position.

11. The terminal according to claim 8, wherein the displaying an offensive and defensive battle interface of the target branch comprises:

displaying defensive resources arranged by the enemy team in a first section of the target branch in the offensive and defensive battle interface;

displaying, in response to the defensive resources arranged in the first section being destroyed, defensive resources arranged by the enemy team in a next section of the first section in the offensive and defensive battle interface; and displaying, in response to defensive resources arranged in a last section of the target branch being destroyed, base defensive resources of the first position in the offensive and defensive battle interface.

12. The terminal according to claim 8, wherein the method further comprises:

displaying a defensive resource configuration interface of the guild battle activity when a current logged-in account has a defensive resource configuration permission, wherein the defensive resource configuration interface is used for configuring the defensive resources of a current guild, the defensive resource configuration interface comprises a battle map of the guild battle activity, and the battle map comprises a plurality of positions;

displaying, in response to a defensive resource configuration operation for a second position in the battle map, defensive resources configured for the second position; and saving, in response to a configuration completion operation for the second position, the defensive resources configured for the second position.

13. The terminal according to claim 8, wherein the method further comprises:

displaying a defensive character providing interface of the guild battle activity when a current logged-in account has a defensive character providing permission, wherein the defensive character providing interface is used for providing a defensive character to a current guild; and adding and displaying, in response to a trigger operation for a defensive character adding control in the defensive character providing interface, the defensive character provided to the current guild.

14. The terminal according to claim 8, wherein the method further comprises at least one of the following:

displaying first ranking data of a current guild, wherein the first ranking data refers to a ranking of the current guild in a current round of guild battle activity, the current round of guild battle activity comprises participation of a plurality of guilds, and the ranking is determined according to round points of each of the plurality of guilds; and displaying second ranking data of the current guild, wherein the second ranking data refers to a ranking of the current guild in a guild battle activity of a current season, the guild battle activity of the current season comprises participation of the plurality of guilds, and the ranking is determined according to round points of each of the plurality of guilds.

15. A non-transitory computer-readable storage medium, storing at least one instruction, the at least one instruction being loaded and executed by a processor of a terminal and causing the terminal to perform a method for controlling a virtual character including:

displaying an activity main interface of a guild battle activity, the guild battle activity including team offensive and defensive activities asynchronously performed between different guilds when the different guilds are not simultaneously online for performing the activities;

in response to a battle operation for a first position of the guild battle activity, displaying a branch selection interface of the first position, the branch selection interface being used for displaying a plurality of branches comprised in the first position;

in response to a selection operation for a target branch of the first position, determining an attack branch of a virtual character as a target branch;

displaying an offensive and defensive battle interface of the target branch when a current team completes battle preparation, the offensive and defensive battle interface being used for displaying a battle scene between the current team and an enemy team; and in response to a control operation for the virtual character, controlling the virtual character to perform a corresponding operation in the battle scene.

16. The non-transitory computer-readable storage medium according to claim 15, wherein the activity main interface comprises a battle map of the guild battle activity, and the battle map comprises a plurality of positions; and the method further comprises:

determining, in response to a battle selection operation for the first position in the battle map, that the battle operation for the first position of the guild battle activity is received;

displaying, in response to an attack mark operation for the first position in the battle map, attack prompt information for the first position;

displaying, in response to an attack suspending mark operation for the first position in the battle map, attack suspending prompt information for the first position; and displaying, in response to a position viewing operation for the first position in the battle map, a terrain of the first position and defensive resources arranged by the enemy team in the first position.

17. The non-transitory computer-readable storage medium according to claim 15, wherein the displaying an offensive and defensive battle interface of the target branch comprises:

displaying defensive resources arranged by the enemy team in a first section of the target branch in the offensive and defensive battle interface;

displaying, in response to the defensive resources arranged in the first section being destroyed, defensive resources arranged by the enemy team in a next section of the first section in the offensive and defensive battle interface; and displaying, in response to defensive resources arranged in a last section of the target branch being destroyed, base defensive resources of the first position in the offensive and defensive battle interface.

18. The non-transitory computer-readable storage medium according to claim 15, wherein the method further comprises:

displaying a defensive resource configuration interface of the guild battle activity when a current logged-in account has a defensive resource configuration permission, wherein the defensive resource configuration interface is used for configuring the defensive resources of a current guild, the defensive resource configuration interface comprises a battle map of the guild battle activity, and the battle map comprises a plurality of positions;

displaying, in response to a defensive resource configuration operation for a second position in the battle map, defensive resources configured for the second position; and saving, in response to a configuration completion operation for the second position, the defensive resources configured for the second position.

19. The non-transitory computer-readable storage medium according to claim 15, wherein the method further comprises:

displaying a defensive character providing interface of the guild battle activity when a current logged-in account has a defensive character providing permission, wherein the defensive character providing interface is used for providing a defensive character to a current guild; and adding and displaying, in response to a trigger operation for a defensive character adding control in the defensive character providing interface, the defensive character provided to the current guild.

20. The non-transitory computer-readable storage medium according to claim 15, wherein the method further comprises at least one of the following:

displaying first ranking data of a current guild, wherein the first ranking data refers to a ranking of the current guild in a current round of guild battle activity, the current round of guild battle activity comprises participation of a plurality of guilds, and the ranking is determined according to round points of each of the plurality of guilds; and displaying second ranking data of the current guild, wherein the second ranking data refers to a ranking of the current guild in a guild battle activity of a current season, the guild battle activity of the current season comprises participation of the plurality of guilds, and the ranking is determined according to round points of each of the plurality of guilds.

* * * * *